United States Patent [19]
Onoda et al.

[11] 3,708,787
[45] Jan. 2, 1973

[54] READ-ONLY MEMORY EMPLOYING METAL-INSULATOR-SEMICONDUCTOR TYPE FIELD EFFECT TRANSISTORS

[75] Inventors: Katsuhiro Onoda; Ryo Igarashi; Toshio Wada; Sho Nakanuma; Tohru Tsujide, all of Tokyo, Japan

[73] Assignee: Nippon Electric Company, Ltd, Minato-Ku, Tokyo, Japan

[22] Filed: March 13, 1970

[21] Appl. No.: 19,435

[30] Foreign Application Priority Data

March 15, 1969 Japan ................................44/20675

[52] U.S. Cl...................340/173 R, 307/238, 30/279
[51] Int. Cl. ............................................G11c 11/40
[58] Field of Search .....340/173 R, 173 FF; 307/238, 307/279

[56] References Cited

UNITED STATES PATENTS

| | | | |
|---|---|---|---|
| 3,500,142 | 3/1970 | Kahng | 340/173 |
| 3,508,211 | 4/1970 | Wegener | 340/173 |

*Primary Examiner*—Terrell W. Fears
*Attorney*—Sandoe, Hopgood and Calimafde

[57] ABSTRACT

A matrix-type read-only memory employing MIS field effect transistors is disclosed in which each transistor has a gate insulator film having the capability of permanently retaining injected charge carriers upon the application of a voltage exceeding a critical value. In a write-in operation, a pair of pulses are respectively applied across the gate electrode and one of the drain and source electrodes. The difference in the voltage levels of the two pulses exceeds the critical value.

4 Claims, 6 Drawing Figures

INVENTORS
KATSUHIRO ONODA
RYO IGARASHI
TOSHIO WADA
SHO NAKANUMA
TOHRU TSUJIDE
by
Sandoe, Hopgood & Calimafde
ATTORNEYS INVENTORS
KATSUHIRO ONODA
RYO IGARASHI
TOSHIO WADA
SHO NAKANUMA
TOHRU TSUJIDE
by
Sandoe, Hopgood & Calimafde
ATTORNEYS

READ-ONLY MEMORY EMPLOYING METAL-INSULATOR-SEMICONDUCTOR TYPE FIELD EFFECT TRANSISTORS

This invention relates generally to a matrix-type read-only memory device employing insulated-gate field effect transistors (abbreviated to IGFET) and, more particularly, to a non-volatile read-only memory device of the kind employing FET's with an alumina film serving as the gate insulator film.

In copending U.S. application Ser. No. 11,426 filed on Feb. 1970, a novel metal-insulator-semiconductor type field effect transistor (MIS FET) employing an alumina film as the gate insulator film is disclosed. That novel MIS FET will be herein referred to as MAS FET. When a voltage higher than a certain critical value is applied across the gate insulator film made of alumina, charge carriers (electrons) which are injected from the gate electrode or from the substrate, are trapped within the alumina film, causing the shift of the gate threshold voltage. The threshold voltage may be defined as a voltage at which drain-source current is initiated to flow. The shift in the gate threshold voltage gives the MAS FET's two distinct states, making it possible to use the MAS FET's as unit memory cells. Also, since the alumina film has been proved to be capable of virtually permanently maintaining the trapped charge carriers, the read-only memory device employing MAS FET constitutes a non-volatile read-only memory.

In the description of the above-mentioned copending amplication, only the diode-mode write-in is conceived, where the write-in voltage is applied across the gate electrode and the substrate. This diode-mode write-in system was later developed into the matrix type read-only memory disclosed in a second application Ser. No. 19,217 filed on Mar. 13, 1970. The invention of the second copending application is not, however, suited for reducing in the number of column and line wirings. Also, when the matrix-type memory device is reduced into an integrated circuit device, an epitaxial layer and an isolation region must be formed so as to electrically isolate the FET's column by column. Since the read-only memory is expected to be as inexpensive as possible, the epitaxial layer and the isolation region should be dispensed with if possible.

On the other hand, read-only memory devices have been developed, employing the silicon nitride ($Si_3N_4$)-silicon dioxide ($SiO_2$) double layer as the gate insulator film for FET's. Write-in and read-out circuits have also beem proposed in connection with those double-layer type FET's (See, for example, the report of H.G. Dill et al titled "Anomalous Behavier in Stacked-Gate MOS Tetrodes" and another report of F.W. Flad, C. J. Varker and H.C. Lins entitled "The Application of MNOS Transistors in a Preset Counter with Non-volatile Memory," both presented at the 1969 IEEE International Solid-State Circuits Conference). However, those write-in and read-out circuits, adapted to those FET's which employ the double layer, are not suited for use in a practical matrix-type memory device. Also, the $Si_3N_4$-$SiO_2$ double layer does not provide a non-volatile read-only memory cell as is well known, because it is not capable of preventing the injected electrons from escaping the trapping centers. In other words, the memory content is easily changed by the application of a voltage of a polarity opposite to the write-in voltage. The write-in and read-out circuits are therefore based on this fundamental property of the double layer. For this reason, the write-in and read-out circuits adapted to the double layer type FET's are not applicable to MAS FET's, for which a circuit is not needed for changing or cancelling the memory contents. For cancelling the memory contents with the present MAS FET, X-rays and other high-energy rays are employed to irradiate the memory plane.

It is therefore an object of the present invention to provide write-in and read-out circuits adapted to MAS FET's which employ the alumina film as proposed in the first-mentioned copending application.

A further object of the invention is to provide a matrix type non-volatile read-only memory device employing MAS FET's as memory cells.

In the memory device of the present invention, write-in is performed by applying a data-representing binary voltage across the gate and drain (or source) electrodes and not across the gate electrode and the substrate. It is not the absolute value of the voltage applied to the gate electrode but the gate-drain-source voltage difference that contributes to the write-in operation. The write-in operation is therefore carried out, for example, by applying a negative voltage of a certain value to the gate, while applying a positive voltage of another certain value to the drain or source electrode. The "certain value" is selected to be lower than the critical voltage for the write-in operation so that the application of merely one of the write-in voltages does not result in a write-in operation. Conversely, the first and second write-in voltages may be of the same polarity, differing only in voltage. In this case, one of the voltages is higher than the critical value, while the other of the voltages is lower than the critical value. The difference between the two voltages should be smaller than the critical value. With this write-in voltage combination, the application of only the higher voltage to the gate of the MAS FET results in the write-in operation, while the simultaneous application of the higher and lower voltages does not cause electron trapping in the alumina film.

At any rate, the appropriate selection of "certain" voltages enables one to selectively carry out the write-in operation of MAS FET's, with the gate electrode and drain or source electrode serving as the input means for a pair of selective write-in pulses.

The invention will now be described in conjunction with the accompanying drawings, in which.

Figure 1:
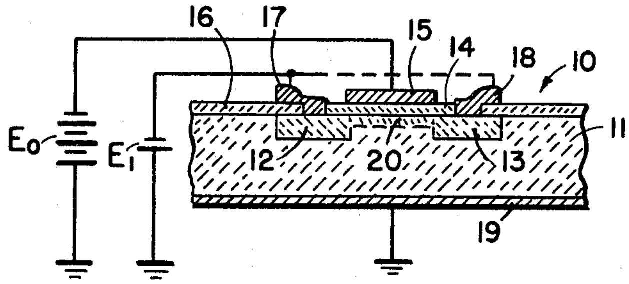
FIG. 1 illustrates a cross-sectional view of an MAS FET with circuit arrangement for write-in operation.

In FIG. 1, a p-channel type MAS FET 10 for constituting a memory cell has a n-type silicon substrate 11, and drain and source regions 12 and 13 of p-type silicon formed through a diffusion process in the substrate 11. An alumina film 14 is formed on the portion of the surface of the substrate defined by the drain and source regions 12 and 13, and a gate electrode 15 is formed on the alumina film 14. Drain and source electrodes 17 and 18 are kept in ohmic contact respectively with regions 12 and 13 and formed on an insulator film 16 covering the substrate 11. On the bottom surface of the substrate 11 is formed an aluminum film 19 connected to ground. As is shown, gate electrode 15 is kept at a voltage $-E_0$, while the drain electrode 17 is kept at a voltage $-E_1$. In this state, the drain and source electrodes should preferably be connected to each other to facilitate the formation of the channel 20 on the surface portion immediately beneath the gate electrode 15. Voltage $E_0$ is higher than the gate threshold voltage of FET 10, while voltage $E_1$ has a value smaller than $E_0$ to make the difference $E_0$–$E_1$ smaller than the critical value.

In this state, the p-type channel extends between the drain and source regions, bringing these regions to the same potential. Our experiments have shown that when the absolute value of the voltage difference $E_0$–$E_1$ is greater than the critical voltage of the MAS FET, the write-in state is achieved where the injected charge carriers are trapped in the alumina film 14. More specifically, in contrast to the write-in operation for the MAS FET of the second copending application, which may be called a diode-mode write-in operation where the absolute value of the gate voltage is dominant, the write-in state in the device of the present invention is achieved by resorting to the absolute value of the voltage difference $E_0$–$E_1$. It follows therefore that the write-in operation can be controlled not only by changing voltage $E_0$ but also by changing voltage $E_1$. More specifically, even if the voltage $E_0$ has the absolute value greater than the critical value $V_C$ of the alumina film, the write-in operation is not carried out so long as the voltage $E_1$ is of the same polarity as the voltage $E_0$ and of such a value as satisfies the relationship $[E_0-E_1]<_C$. This suggests the column and line-selection which is indispensable to the matrix-type memory.

In FIG. 1, it has been assumed the FET is of the p-channel type. Therefore, the voltages supplied to gate electrode and drain or source electrode are all negative with respect to the substrate. If an n-channel type FET is employed, the polarity of these voltages should be reversed.

Figure 2:
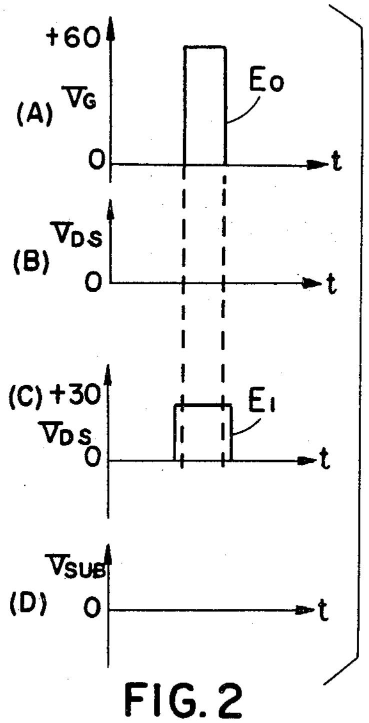
FIG. 2 shows a waveform diagram for explaining the write-in operation.

Referring to FIG. 2, a 60-volt write-in voltage $E_0$ above the critical value is applied to the gate electrode as the gate voltage $V_G$ (FIG. 2(A)), while the substrate 11 is maintained at $V_{sub}$ which is zero volt in FIG. 2(B). As for those memory cell FET's of the n-channel type whose substrate voltage $V_{sub}$ and the drain-source voltage $V_{DS}$ are maintained at zero volt as shown in FIG. 2(B), the gate-substrate voltage is $E_0$, causing the alumina film 14 to turn into the written-in state. In contrast, for those FET's whose drain-source voltage $V_{DS}$ is maintained at voltage $E_1$ of about 30 volts, the write-in operation is not performed because the difference between voltages $E_0$ and $E_1$ is about 30 volt which is lower than the critical value. Thus, the selective write-in operation is carried out by selecting the combinations of the polarity and values of the voltages $E_0$ and $E_1$ (the voltage $E_1$ may be such an aribitrary value as makes the $E_0$–$E_1$ difference greater than the critical value for "write-in," and makes the difference smaller than the same critical value for "non-write-in").

As will be seen from the above description, the present invention provides a write-in circuit arrangement for a matrix-type MAS FET read-only memory, resorting to the fact that the write-in operation depends on the difference between the gate voltage and drain-source voltage.

Figure 3:
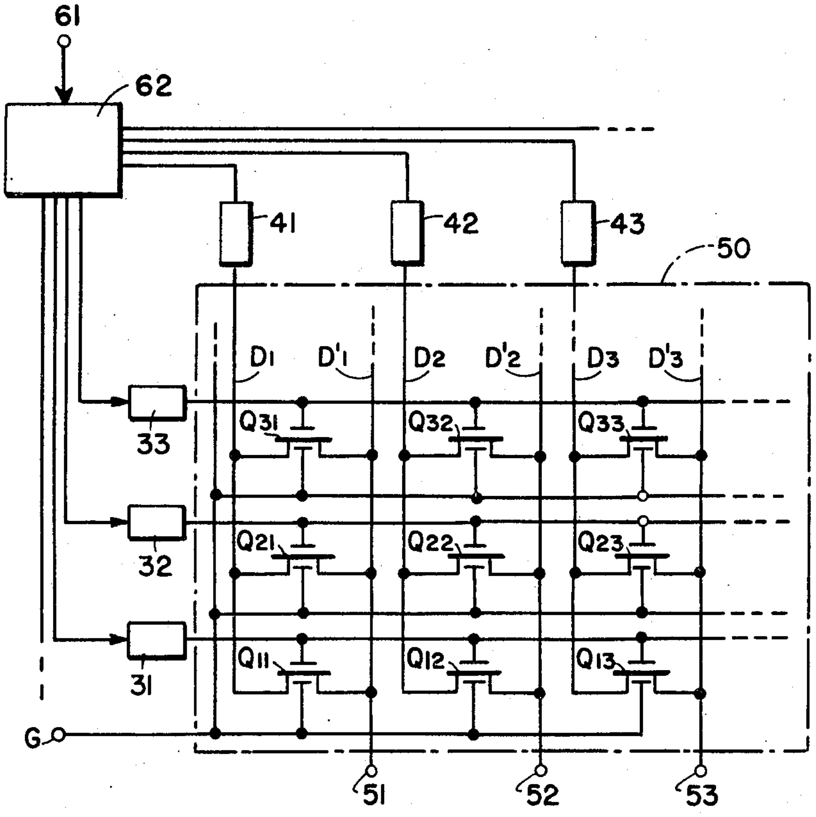
FIG. 3 shows an embodiment of the present invention.

Referring to FIG. 3, the embodiment of the present invention comprises n-channel type MAS FET's $Q_{11}$, $Q_{12}$, $Q_{13}$, . . ., $Q_{21}$, $Q_{22}$, $Q_{23}$, . . ., $Q_{31}$, $Q_{32}$, $Q_{33}$, ... arranged in a matrix form.

The FET's $Q_{11}$, $Q_{12}$, $Q_{13}$, . . . constituting the first line of the matrix have their respective gate electrodes coupled in common to a first line-drive circuit 31. Similarly, the gate electrodes of the second-line FET's $Q_{21}$, $Q_{22}$, $Q_{23}$, . . . are connected in common to a second line-drive circuit 32, and those of the third-line FET's $Q_{31}$, $Q_{32}$, $Q_{33}$, . . . to a third line-drive circuit 33. Likewise, drain electrodes of the first-column FET's $Q_{11}$, $Q_{21}$, $Q_{31}$, . . . are coupled in common to a first column-drive circuit 41, those of second-column FET's $Q_{12}$, $Q_{22}$, $Q_{32}$, 111 to a second column-drive circuit 42, and those of third-line FET's $Q_{13}$, $Q_{23}$, $Q_{33}$, . . . to a third column-drive circuit 43. The source electrodes of the first, second, and third-column FET's are connected in common respectively to read-out output terminals 51, 52 and 53. The substrate electrodes of the FET's are coupled to a common reference potential terminal G.

It is to be noted here that the number of FET's is limited to 3×3 only for simplicity of the description, and that the number can be increased arbitrarily depending upon the amount of information to be stored. The dotted lines extending in the row or line and column directions imply this possibility.

The line-drive circuits 31, 32, and 33 and the column-drive circuits 41, 42, and 43 are respectively connected to an address decoder 62, to which data to be stored is supplied from a data processor (not shown) through the input terminal 61. The description of address decoder 62, line-drive circuits 31, 32, and 33 and column-drive circuits 41, 42 and 43 are omitted here because these elements may be composed of those circuit elements commonly used in conventional matrix-type memory devices. It will be apparent to those skilled in the art that the line- and column- drive circuits for generating write-in voltages may be composed of those circuits similar to those employed in conventional matrix-type memory devices.

In a write-in operation, the address of the data supplied from input terminal is determined at address decoder 62. The line- and column- drive circuits selected as a result of the address decoding produce drive pulses as shown in FIG. 2, which are simultaneously supplied to an address-selected FET. Since the application of the above-the-critical voltage raises the threshold level in the case of MAS FET's, the write-in operation for logic "1" signal is performed in the above-mentioned way. For a logic "0" the write-in operation is carried out by applying only the outputs of line-drive circuits to the gate electrodes of the FET's.

Thus, those memory cells to which the outputs of line- and column- drive circuits are simultaneously supplied are in the "1" state where the alumina gate-insulator film is not in the written-in state because the voltage difference $E_0$–$E_1$ is smaller than the critical voltage. Conversely, for those memory cells to which only the outputs of the line-drive circuits are supplied are in the "0" state, where the alumina film of the FET's is in the written-in state as a result of the direct application of the above-the-critical voltage.

In a read-out operation, the selected column-drive circuits produce the read-out source voltage, which is supplied to the drain electrodes of the FET's column by column. At the same time, an interrogation pulse is supplied from the selected one of the line-drive circuits to the gate electrodes of the FET's line by line. Since the interrogation voltage is predetermined to be higher than the gate threshold voltage of the FT's with an alumina film in a non-written-in state and lower than that of the FET's with an alumina film in a written-in state (the interrogation voltage must be lower than the critical value), the application of the interrogation pulse causes the drain-source current to flow for those FET's in the "1" state (where the alumina film is in the non-written-in state) and not for those FET's in the "0" state (with the alumina film is in the written-in state). The read-out outputs are sensed at the terminals 51, 52, and 53, by employing sense amplifiers, if necessary.

Figure 4:
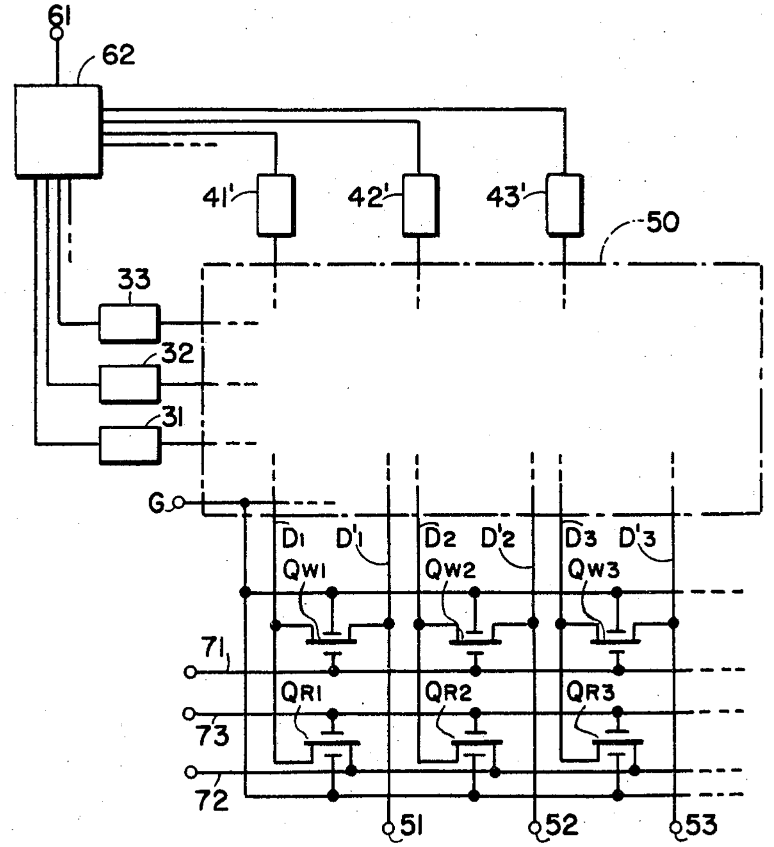
FIG. 4 shows a modification of the embodiment.

The modification of the embodiment shown in FIG. 4 further comprises regular FET's $Q_{W1}$, $Q_{W2}$, and $Q_{W3}$ for shunting in the write-in stage the drain and source electrodes of all FET's simultaneously. Also, another line of regular FET's $Q_{R1}$, $Q_{R2}$ and $Q_{R3}$ is employed for selectively supplying a read-out voltage in place of the column-drive circuits 41', 42', 43', which are respectively similar to the drive circuits 41, 42, and 43 with the exception that the latter have the function of generating the read-out source voltage. Gate electrodes of shunting transistors $Q_{W1}$, $Q_{W2}$, and $Q_{W3}$ are connected in common to an input terminal 71 for a write-in command pulse which is supplied from a data processor (not shown). On the other hand, drain electrodes of those shunting transistors are connected respectively to column-drive lines $D_1$, $D_2$, and $D_3$, while source electrodes are respectively connected to read-out wires $D_1'$, $D_2'$, and $D_3'$. The substrate electrodes are connected in common to the terminal G.

In a write-in operation, the write-in command signal is applied to the input terminal 71. This makes FET's $Q_{W1}$, $Q_{W2}$, and $Q_{W3}$ turn conductive, shunting the drain and source electrodes. Since the drain and source electrodes are connected to the corresponding electrodes of the first-column FET's, this facilitates the write-in operation as described in conjunction with FIG. 1.

The transistors $Q_{R1}$, $Q_{R2}$, and $Q_{R3}$ aimed at partly replacing the column-drive circuits 41, 42, and 43 (FIG. 3), are coupled at their drain electrodes in common to a power supply terminal 72 which is connected to a DC power source (not shown). On the other hand, gate electrodes are connected in common to the write-in command input terminal 73, and the substrate electrodes are connected to the terminal G. Upon the application of the write-in command pulse, FET's $Q_{R1}$, $Q_{R2}$, $Q_{R3}$ turn conductive to supply the read-out source voltage to the memory-cell FET's all at the same time. The write-in operation itself is just the same as in the embodiment of FIG. 3. Therefore, further description will not be given here.

The gate insulator film of these regular FET's may be formed of alumina film, to which the above-the-critical voltage is never applied. Such alumina film may be formed in common to all other memory-cell FET's.

It will be quite apparent to those skilled in the art that the embodiment of FIG. 3 and its modification of FIG. 4 are easily realized in the form of an integrated circuit device. The only trouble with reducing the present memory device into a practical IC device is that a parasitic channel is formed between each of the memory-cell FET's and its neighboring FET's. In extreme cases, the parasitic channel extends to the channel portion of the neighboring FET, affecting the operation thereof. To prevent this, a channel isolating means is usually employed for each of the FET's.

Figure 5A:
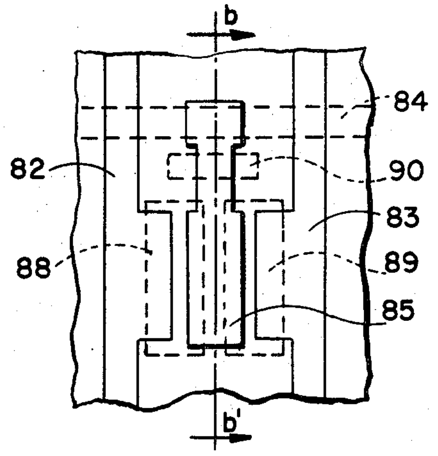
FIG. 5 shows an integrated circuit structure into which the circuit of the invention has been reduced.
Figure 5B:
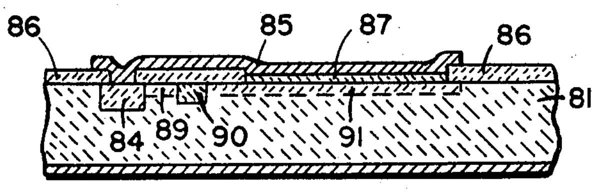

Referring to FIGS. 5(A) and 5(B) which respectively show a plan view and a cross-sectional view at line b—b' of FIG. 5(A), one of the memory-cell FET's is shown reduced into an IC device. In this IC device, column-drive wiring 82 (corresponding to wiring $D_1$, $D_2$, and $D_3$ of FIG. 3), read-out wiring 83 (corresponding to $D_1'$, $D_2'$, $D_3'$), line-drive wiring 84 (corresponding to $W_1$, $W_2$, $W_3$) and gate electrode 85 are formed on the surface of a p-type silicon substrate 81. Needless to say, drive wirings 82 and 83 are formed on the substrate 81 with an insulator film 86 interposed therebetween. Beneath the gate electrode 85 is formed an alumina film 87 which is peculiar to the present invention. The line-drive wiring 84 is formed of a highly doped region formed in the substrate. The substrate portion 89 defined by the column-drive wiring 82 and gate electrode 85 and another substrate portion 88 corresponding to the former, serve respectively as drain and source regions.

In this structure, when the conductive channel is formed beneath the gate electrode 85 by the application of a voltage to the drain or source electrode, this channel extends to reach the portion of line-drive wiring forming the parasitic channel 89, which possibly affects the function of a neighboring memory-cell FET not shown. To avoid such an undesirable interference, another diffusion region 90 is formed through diffusion. Thus, the parasitic channel 89 is electrically isolated from the main channel 91.

In the foregoing embodiment and its modification, the substrate has been assumed to be of p-type silicon. Needless to say, this may also be of n-type silicon. If the latter is employed, the polarity of the write-in voltages $E_0$ and $E_1$ should be the reverse of those shown in FIG. 1. Also, the channel isolator shown in FIG. 5 may be of straight-lined highly doped regions which are formed in common to memory-cell FET's line by line. Moreover, the line-drive wiring 84 formed of the diffusion region in FIG. 5 may be replaced with metal-film wiring with insulator film interposed therebetween for forming the cross-over with column-drive wirings and read-out wirings. Furthermore, it is to be noted that the circuit arrangement of the present invention is applicable not only to the matrix-type MAS FET memory devices but also to those memory devices of the kind which employ memory-cell FET's having gate insulator film other than alumina film but having a similar non-volatile property.

While the invention has been herein specifically described with respect to only several embodiments thereof, it will be understood that variations may be made therein, all without departing from the spirit and scope of the invention.

We claim:

1. A memory device comprising a plurality of insulated-gate field effect memory transistors, each having a gate, a source and a drain and arranged in a plurality of intersecting lines and columns, each of said memory transistors having an insulated-gate structure and including an alumina gate insulator film capable of retaining injected charge carriers trapped therein when a voltage higher than the critical value is applied across said gate insulator, a plurality of line-drive conductive paths directly connected in common to the gates of said memory transistors line by line, a plurality of column-drive conductive paths directly connected to said memory transistors column by column at one of said drain and source of each of said memory transistors, means for supplying during a write-in phase of said memory device a first signal to selected ones of said line-drive conductive paths, said first signal having a polarity and magnitude capable of forming a temporary conductive channel by field effect between the source and drain beneath the gate insulator in each of said memory transistors the gates of which are connected to said selected ones of said line-drive conductive paths, means for supplying in said write-in phase a second signal to selected ones of said column-drive conductive paths to make the temporary conductive channel of each of said selected memory transistors formed by said first signal at the potential of said second signal, and means for supplying a third signal to non-selected ones of said column drive conductive paths to make the temporary conductive channel of each of said non-selected memory transistors at the potential of said third signal, said second signal being so selected that the absolute value of the difference of said first signal and said second signal exceeds said critical value, whereby a voltage higher than said critical value is applied between the gate and the temporary conductive channel of each of said selected memory transistors and the gate insulator of each of said selected memory transistors retains injected charge carriers trapped therein, and said third signal being so selected that the absolute value of the difference of said first signal and said third signal is less than said critical value, whereby no voltage higher than said critical value is applied between the gates and the temporary conductive channels of each of said non-selected memory transistors.

2. The memory device as claimed in claim 1, wherein said first signal is greater than said critical value.

3. The memory device as claimed in claim 1, wherein said first signal has a magnitude greater than said critical value, said second signal is at ground potential, and said third signal has the same polarity as that of said first signal and a magnitude lower than said critical value.

4. The memory device as claimed in claim 1, wherein said first signal has a magnitude lower than said critical value and said second signal has a polarity opposite to that of said first signal and a magnitude lower than said critical value.

* * * * *